(No Model.)
P. H. HOLMES.
COMPOSITION OF MATTER FOR JOURNAL BEARINGS.
No. 481,949.  Patented Sept. 6, 1892.
FIG. 3.
FIG. 1.  FIG. 2.
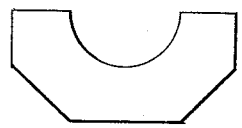 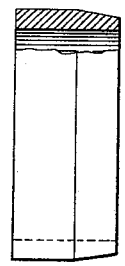
FIG. 4.
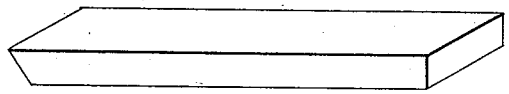
Witnesses:
Alex. Barkoff
Jos. H. Klein.
Inventor:
Philip H. Holmes
by his Attorneys
Howson & Howson

UNITED STATES PATENT OFFICE.

PHILIP H. HOLMES, OF GARDINER, MAINE, ASSIGNOR TO THE HOLMES FIBRE-GRAPHITE MANUFACTURING COMPANY, OF CHICAGO, ILLINOIS.

COMPOSITION OF MATTER FOR JOURNAL-BEARINGS.

SPECIFICATION forming part of Letters Patent No. 481,949, dated September 6, 1892.

Application filed January 2, 1892. Serial No. 416,857. (No specimens.)

*To all whom it may concern:*

Be it known that I, PHILIP HENRY HOLMES, a citizen of the United States, and a resident of Gardiner, Kennebec county, Maine, have invented an Improved Composition of Matter for Journal-Bearings, &c., of which the following is a specification.

The object of my invention is to produce an improved composition of matter adapted for use as a journal-bearing, packing, projectile ring, commutator-brush, and for use where two parts come into frictional contact or use as a conductor of electricity.

In the accompanying drawings, Figures 1, 2, 3, and 4 are views of different articles made of my improved composition of matter.

My improved composition of matter consists of plumbago, carbonized fiber, and carbonized oil and a resinified oil. I first intimately mix plumbago, preferably finely divided and floated, with divided fiber, preferably finely divided by any of the ordinary pulp-making machines. The plumbago and fiber are mixed together in fluid, preferably water. Then the material is introduced into a mold and so compressed as to discharge the water, leaving the fiber and plumbago in a solidified mass. A filtering medium may be introduced, such as gypsum, in order that the loose particles of plumbago will not be carried off by the water, this filtering material acting with the fiber to hold the plumbago within the mold. The product is then dried and saturated with oil. Any oil that will carbonize under heat will answer; but I prefer using a drying-oil. The compound, thoroughly saturated, is then baked under sufficient heat to thoroughly carbonize the fiber and oil throughout the mass, although in some cases only the exterior surface may be carbonized, according to the use to which the article is to be put. I carbonize the material while not exposed to the air preferably in a sand or graphite bath heated to the required temperature. In order to strengthen the carbonized compound, I immerse it in a drying or semi-drying oil or an oil which can be converted into a binder, so that the composition will be firmly held together, and the composition is then baked; but the degree of heat must not be sufficient to carbonize the oil. By this plan I utilize the fiber as an entangling medium to hold the plumbago while under treatment and then convert it into structural carbon, the oil with which the compound was originally saturated being converted into deposited carbon and the oil of the second impregnation being simply set or resinified, so as to strengthen and toughen the mass.

The essential feature of my invention as distinguished from my other inventions in the same field is the final oil treatment of the carbonized compound.

I claim as my invention—

1. A composition of matter consisting of plumbago, carbonized fiber, deposited carbon, and an uncarbonized oil binder.

2. The process herein described of making a composition of matter, said process consisting in, first, making a composition of plumbago, fiber, and a carbonizable oil; second, subjecting the composition to such a heat as to carbonize the fiber and oil; third, subjecting the composition to a treatment with an oil binder, and, fourth, drying or heating the composition, so as to cause the oil to set or resinify, substantially as described.

In testimony whereof I have signed my name to this specification in the presence of two subscribing witnesses.

PHILIP H. HOLMES.

Witnesses:
 EUGENE ELTERICH,
 HENRY HOWSON.